(12) United States Patent
Kawahara

(10) Patent No.: US 9,702,445 B2
(45) Date of Patent: Jul. 11, 2017

(54) TORQUE CONVERTER

(75) Inventor: Yuki Kawahara, Osaka (JP)

(73) Assignee: EXEDY Corporation, Osaka (JP)

( * ) Notice: Subject to any disclaimer, the term of this patent is extended or adjusted under 35 U.S.C. 154(b) by 626 days.

(21) Appl. No.: 13/514,722

(22) PCT Filed: Oct. 15, 2010

(86) PCT No.: PCT/JP2010/068125
§ 371 (c)(1),
(2), (4) Date: Jun. 8, 2012

(87) PCT Pub. No.: WO2011/070852
PCT Pub. Date: Jun. 16, 2011

(65) Prior Publication Data
US 2012/0247901 A1    Oct. 4, 2012

(30) Foreign Application Priority Data
Dec. 9, 2009   (JP) ................................ 2009-279086

(51) Int. Cl.
*F16H 45/02*   (2006.01)
(52) U.S. Cl.
CPC ....... *F16H 45/02* (2013.01); *F16H 2045/0205* (2013.01); *F16H 2045/0226* (2013.01);
(Continued)
(58) Field of Classification Search
CPC ............... F16H 2045/0278; F16H 2045/0236; F16H 2045/0252; F16H 2045/0263; F16H 2045/0268
(Continued)

(56) References Cited

U.S. PATENT DOCUMENTS 8,573,374 B2 * 11/2013 Magerkurth et al. ........ 192/3.29
2001/0008198 A1 * 7/2001 Maienschein et al. ...... 192/3.29
(Continued)

FOREIGN PATENT DOCUMENTS

| JP | 2001-82577 A | 3/2001 |
| JP | 2002-48217 A | 2/2002 |

(Continued)

OTHER PUBLICATIONS

Office Action of the corresponding Chinese Application No. 201080054982.2, dated Mar. 27, 2014.

*Primary Examiner* — Stacey Fluhart
(74) *Attorney, Agent, or Firm* — Global IP Counselors, LLP

(57) ABSTRACT

An axial-direction space can be made more compact while widening a damper twisting angle of a lockup device such that a damper characteristic can be further improved. This torque converter comprises a torque converter main body and a lockup device. The lockup device has a plurality of outer peripheral-side torsion springs and a plurality of inner peripheral side torsion springs. The outer peripheral-side torsion springs are arranged along a circumferential direction at an attachment diameter. The inner peripheral-side torsion springs are arranged along a circumferential direction at a second attachment diameter radially inward of the outer peripheral torsion springs and operate in series with the outer peripheral torsion springs. Also, the attachment diameter is equal to or larger than an outer diameter of a torus, and the attachment diameter is equal to or smaller than an inner diameter of the torus.

6 Claims, 2 Drawing Sheets

(52) U.S. Cl.
CPC ............... *F16H 2045/0231* (2013.01); *F16H 2045/0294* (2013.01)

(58) Field of Classification Search
USPC ............. 192/3.29, 3.28, 213.1, 213.2, 55.61; 60/338; 11/3.29; 464/681, 68.4, 68.8, 68.1
See application file for complete search history.

(56) References Cited

U.S. PATENT DOCUMENTS

| | | | |
|---|---|---|---|
| 2001/0052443 | A1 | 12/2001 | Tomiyama et al. |
| 2004/0226794 | A1 | 11/2004 | Sasse et al. |
| 2009/0183962 | A1* | 7/2009 | Nakamura .............. F16H 45/02 192/3.29 |
| 2009/0247307 | A1* | 10/2009 | Ishikawa et al. ........... 464/68.8 |
| 2011/0011691 | A1* | 1/2011 | Tomiyama .............. F16H 45/02 192/3.29 |
| 2011/0099992 | A1* | 5/2011 | Magerkurth et al. ........... 60/435 |

FOREIGN PATENT DOCUMENTS

| | | | | |
|---|---|---|---|---|
| JP | 2002-147563 | | 5/2002 | |
| JP | 2004-308904 | A | 11/2004 | |
| JP | 2007-113661 | A | 5/2007 | |
| JP | 2007-162936 | A | 6/2007 | |
| JP | 2009-250288 | A | 10/2009 | |
| WO | WO 2009122827 | A1 * | 10/2009 | ............. F16H 45/02 |

* cited by examiner

TORQUE CONVERTER

CROSS-REFERENCE TO RELATED APPLICATIONS

This U.S. national phase application claims priority to Japanese Patent Application No. 2009-279680 filed on Dec. 9, 2009. The entire disclosure of Japanese Patent Application No. 2009-279680 is hereby incorporated herein by reference.

BACKGROUND

Technical Field

The present invention relates to a torque converter, particularly a torque converter equipped with a lockup device having a plurality of torsion springs in each of an outer periphery and an inner periphery.

RELATED ART

Torque converters are often provided with a lockup device for transmitting torque directly from a front cover to a turbine. This lockup device has a piston that can frictionally couple to the front cover, a drive plate onto which the piston is fixed, a plurality of torsion springs supported by the drive plate, and a driven plate elastically coupled to the piston in a rotational direction by the torsion springs. The driven plate is fixed to the turbine.

The piston divides a space between the front cover and the turbine in an axial direction and can be moved in the axial direction by a hydraulic pressure difference in both axial-direction sides. Also, torque of the front cover is transmitted to the lockup device when an annular friction facing provided on an outer peripheral portion of the piston is pressed against a flat friction surface of the front cover.

When torque is being transmitted with the lockup device, it is necessary to change the torsion springs to a lower stiffness and a wider twisting angle in order to absorb and attenuate torque fluctuations inputted from an engine. Therefore, as shown in Patent Document 1, a device has already been proposed in which torsion spring springs are arranged on each of an outer peripheral portion and an inner peripheral portion and the torsion springs on the outer peripheral side and the torsion springs on the inner peripheral side are coupled by an intermediate member.

Also, regarding a torque converter equipped with a lockup device, a configuration like that presented in Patent Document 2 has been proposed in order to shorten an axial direction dimension. In that document, the axial-direction dimension is shortened by making the torus smaller and flatter.

Laid-open Japanese Patent Application Publication No. 2001-82577 (Patent Document 1) is an example of the related art.

Laid-open Japanese Patent Application Publication No. 2002-147563 (Patent Document 2) is another example of the related art.

SUMMARY

Advantage the Invention is to Achieve

In the torque converter shown in Patent Document 1, the torsion springs on the outer peripheral side and the torsion springs on the inner peripheral side operate in series through the intermediate member. The torsion springs on the inner peripheral side are arranged such that two coil springs operate in series. Consequently, a damper twisting angle is widened.

However, in the device presented in Patent Document 1, the axial-direction dimension is long in order to avoid interference between the inner peripheral-side torsion springs and the turbine and the device cannot be made more compact. Also, with the configuration presented in Patent Document 1, a good damper characteristic cannot be obtained because a coil diameter of the coil springs is small in order to shorten the axial-direction dimension.

Meanwhile in the torque converter presented in Patent Document 2, the axial-direction dimension is shortened because the torus is flattened. However, in this case, a wide twisting angle cannot be secured and a good damper characteristic cannot be obtained.

An advantage of the present invention is to enable an axial-direction space to be made more compact while widening the damper twisting angle of the lockup device such that the damper characteristic can be further improved.

A torque converter according to a first aspect of the invention is a torque converter that transmits a torque inputted from a front cover to a member on a transmission side and includes a lockup device and a torque converter main body having an impeller, a turbine, and a stator. The lockup device is a device for mechanically connecting the front cover and the turbine together and has a plurality of outer peripheral-side torsion springs and a plurality of inner peripheral-side torsion springs. The outer peripheral-side torsion springs are arranged along a circumferential direction at a first attachment diameter. The inner peripheral-side torsion springs are arranged along a circumferential direction at a second attachment diameter radially inward of the outer peripheral torsion springs and operate in series with the outer peripheral torsion springs. The first attachment diameter is equal to or larger than an outer diameter of a torus formed by the blades of the torque converter main body, and the second attachment diameter is equal to or smaller than an inner diameter of the torus.

With this torque converter, when the lockup device is on (in a locked state), the torque from the engine is transmitted from the front cover to the outer peripheral-side torsion springs and further transmitted to the inner peripheral-side torsion springs and outputted to the turbine.

With this aspect, since the outer peripheral-side torsion springs are arranged radially outward of the torus and the inner peripheral-side torsion springs are arranged radially inward of the torus, it is difficult for the torsion springs and the torque converter main body to interfere with each other and an axial-direction space of the entire device can be made more compact. Also, for similar reasons, torsion springs having larger coil diameters than in a conventional device can be used and, thus, a damper characteristic that is effective against vehicle vibrations can be set.

Additionally, since the outer peripheral-side torsion springs and the inner peripheral-side torsion springs operate in series, a wide twisting angle can be secured and a damper characteristic that is even more effective against vehicle vibrations can be set.

A torque converter according to a second aspect of the invention is the torque converter according to the first aspect, wherein a portion of the turbine that is closest to the front cover is positioned more toward the front cover than portions of the outer peripheral torsion springs and inner peripheral torsion springs that are closest to the torque converter main body.

With this aspect, since the torsion springs and the torque converter main body are arranged to overlap each other in an axial direction, the axial-direction dimension of the torque converter as a whole can be shortened.

A torque converter according to a third aspect of the invention is a torque converter according to the first aspect, which further includes a float member that moves freely in a rotational direction and causes at least two of the outer peripheral-side torsion springs to operate in series.

With this aspect, not only do the outer peripheral-side torsion springs and the inner peripheral-side torsion springs operate in series with each other, but the float member causes at least two of the outer peripheral-side torsion springs to operate in series, and therefore the float member enables the twisting angle to be widened further.

A torque converter according to a fourth aspect of the invention is the torque converter according to the third aspect, wherein the float member is provided such that it covers an outer peripheral portion of the outer peripheral-side torsion springs.

With this aspect, the float member can prevent the outer peripheral-side torsion springs from dislodging due to centrifugal force. Although the outer peripheral portions of the outer peripheral-side torsion springs and an inner peripheral surface of the float member undergo sliding contact when the outer peripheral-side torsion springs elongate and contract, the sliding resistance between the torsion springs and the float member is small because the float member moves freely in the rotational direction. Thus, a hysteresis torque can be made small.

DETAILED DESCRIPTION OF THE EXEMPLARY EMBODIMENTS

Figure 1:
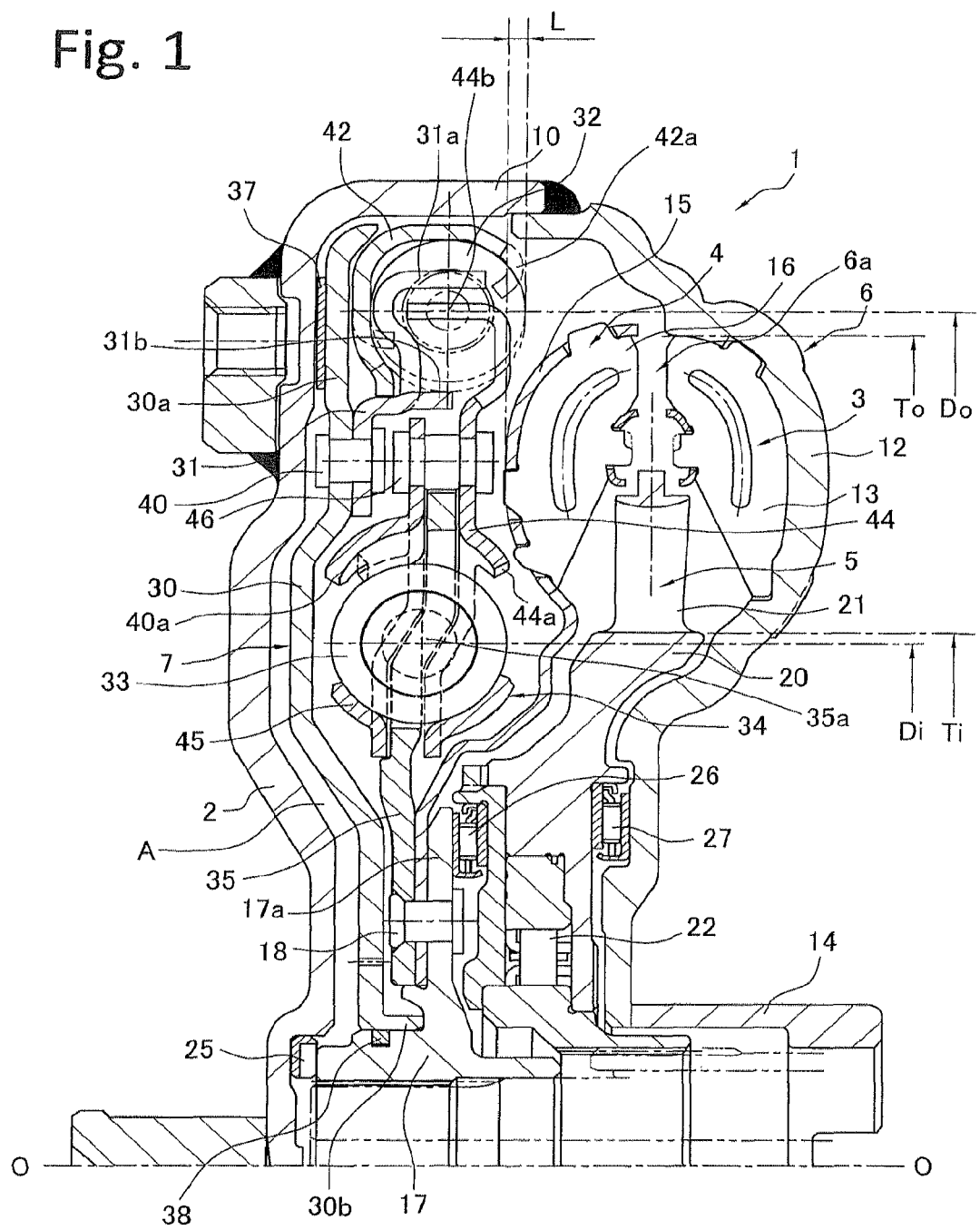
FIG. 1 is a partial sectional view of a torque converter according to an embodiment of the present invention.
Figure 2:
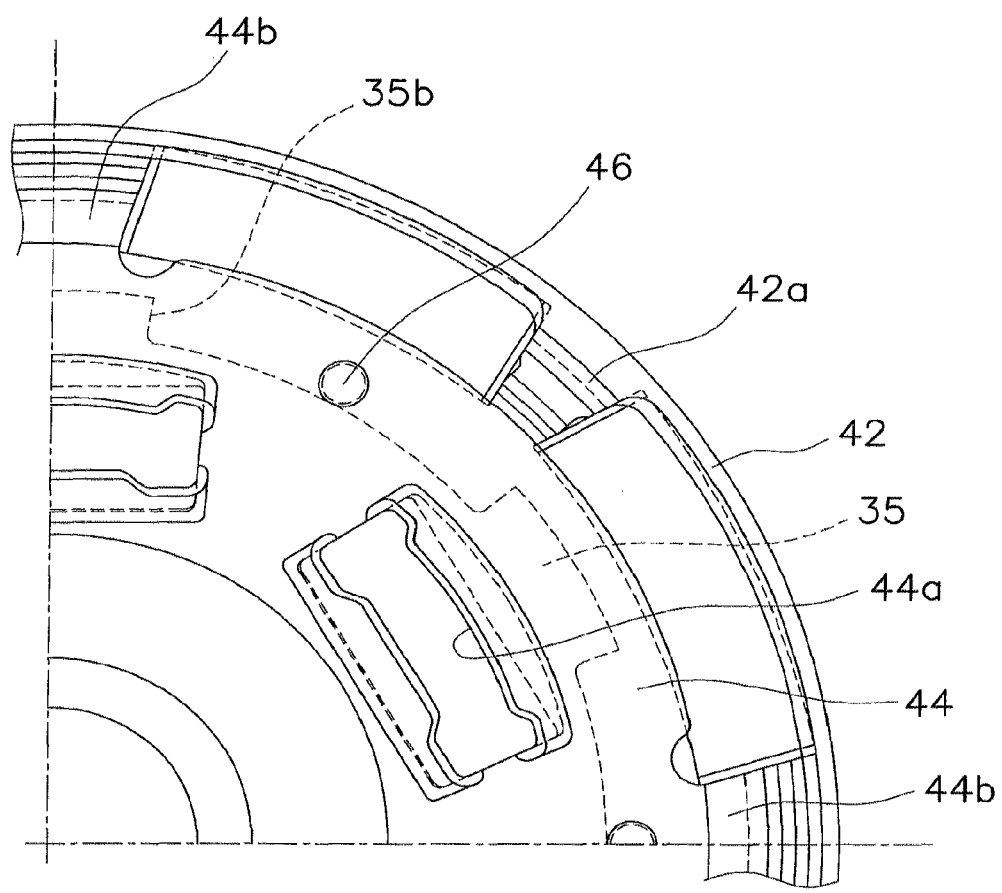
FIG. 2 is a partial frontal view of the lockup device.

FIG. 1 is a partial sectional view of a torque converter according to an embodiment of the present invention. An engine (not shown) is arranged on a left-hand side of FIG. 1 and a transmission (not shown) is arranged on a right-hand side of the figure. FIG. 2 is a partial frontal view of the lockup device. In FIG. 2, the torsion springs serving as elastic members are omitted. The line O-O shown in FIG. 1 is a rotational axis of the torque converter and the lockup device.

Overall Configuration of Torque Converter

The torque converter 1 is a device for transmitting torque from a crankshaft (not shown) of the engine to an input shaft of the transmission and includes a front cover 2 fixed to a member on an input side, a torque converter main body 6 made up of three types of bladed wheel (impeller 3, turbine 4, and stator 5), and a lockup device 7.

The front cover 2 is a circular disk-shaped member having an outer peripheral cylindrical portion 10 on an outer peripheral portion thereof that protrudes in an axial direction toward the transmission. The impeller 3 includes an impeller shell 12, a plurality of impeller blades 13, and a cylindrical impeller hub 14. The impeller shell 12 is fixed by welding to the outer peripheral cylindrical portion 10 of the front cover 2. The impeller blades 13 are fixed to an inside of the impeller shell 12. The impeller hub 14 is provided on an inner peripheral side of the impeller shell 12. The turbine 4 is arranged inside a fluid chamber facing opposite the impeller 3. The turbine 4 includes a turbine shell 15, a plurality of turbine blades 16 fixed to the turbine shell 15, and a turbine hub 17 fixed to an inner peripheral side of the turbine shell 15. The turbine hub 17 has a flange 17a that extends radially outward, and an inner peripheral portion of the turbine shell 15 is fastened to the flange 17a with a plurality of rivets 18. Also, the input shaft of the transmission (not shown) is spline-engaged with an inner peripheral portion of the turbine hub 17.

The stator 5 is arranged between inner peripheral portions of the impeller 3 and the turbine 4 and is a mechanism for redirecting the flow of an operating oil returning from the turbine 4 to the impeller 3. The stator 5 includes chiefly a circular disk-shaped stator carrier 20 and a plurality of stator blades 21 provided on an outer peripheral surface of the stator carrier. The stator carrier 20 is supported on a stationary shaft (not shown) through a one-way clutch. A thrust washer 25 is provided axially between the front cover 2 and the turbine hub 16, and thrust bearings 26 and 27 are provided between the turbine hub 17 and the stator carrier 20 and between the stator carrier 20 and the impeller shell 12, respectively.

In a torque converter 1 like one explained heretofore, the impeller blades 13, the turbine blades 16, and the stator blades 21 form a torus 6a that is filled with operating oil.

Lockup Device

The lockup device is arranged in an annular space between the front cover 2 and the turbine 4. The lockup device 7 includes chiefly a piston 30, a drive plate 31, a plurality of outer peripheral-side and inner peripheral side torsion springs 32 and 33, an intermediate member 34 that couples the torsion springs 32 on the outer peripheral-side and the torsion springs 33 on the inner peripheral side, and a driven plate 35.

Piston

The piston 30 is a circular disk-shaped plate member arranged to divide a space between the front cover 2 and the turbine 4 in two in an axial direction. An outer peripheral portion of the piston 30 forms a flat friction coupling portion 30a, and a friction facing 37 is formed on an axial-direction engine side of the friction coupling portion 30a. A flat friction surface is formed on the front cover 2 facing the friction facing 37. An inner peripheral cylindrical portion 30b extending in an axial direction toward the transmission is provided on an inner peripheral edge of the piston 30. An inner peripheral surface of the inner peripheral cylindrical portion 30b is supported such that it can move in an axial direction and a rotational direction with respect to an outer peripheral surface of the turbine hub 17. When a tip end of the inner cylindrical portion 30b contacts a portion of the turbine hub 17, the piston 30 is restricted from moving further in an axial direction toward the transmission. A seal ring 38 is provided between the inner peripheral cylindrical portion 30b and the outer peripheral surface of the turbine hub 17.

In this way, a space A is formed between the front cover 2 and the piston 30. An outer peripheral portion of the space A is blocked by the friction facing 37 contacting the front cover 2, and an inner peripheral portion of the space A is coupled to an oil passage formed in the input shaft via a groove formed in the thrust washer 25.

Drive Plate

The drive plate 31 is an annular member made of sheet metal and arranged on the axial-direction transmission side of the friction coupling portion 30a of the piston 30. An inner peripheral portion of the drive plate 31 is fastened to the piston 30 with a plurality of rivets 40. A plurality of engaging portions 31a that extend toward the transmission in an axial direction are formed on an outer peripheral portion of the drive plate 31. The engaging portions 31a are formed with a prescribed spacing in a circumferential direction and support the end faces of the outer peripheral-side torsion springs 32. Additionally, support portions 31b that extend toward the transmission in an axial direction are formed above a piston attaching portion of the drive plate 21. The support portions 31b support an inner peripheral side of the outer peripheral-side torsion springs 32.

Outer Peripheral-Side Torsion Springs

Each of the outer peripheral-side torsion springs 32 includes a combination of a large coil spring and a small coil spring that is inserted into an interior of the large coil spring and has a shorter spring length than the large coil spring. In this embodiment, a total of eight outer peripheral-side torsion springs 32 are arranged along a rotational direction in pairs of two, and the float member 42 is provided such that the two outer peripheral-side torsion springs 32 of each pair operate in series. The float member 42 is a annular member having a C-shaped cross section and arranged above the support portion 31b of the drive plate 31. The float member 42 is arranged such that it can rotate relative to the drive plate 31, and an outer peripheral portion of the float member supports outer peripheral portions of the outer peripheral-side torsion springs 32. That is, the float member 42 restricts the outer peripheral-side torsion springs 32 such that they do not become dislodged in a radially outward direction. Tip end portions 42a on the axial-direction transmission side of the float member 42 are bent radially inward and toward the engine, and bent portions 42a of these tip end portions are inserted between the outer peripheral-side torsion springs 32 of each pair. That is, both circumferential-direction end faces of the bent portions 42a abut against an end face of a corresponding torsion spring 32.

Thus, as explained previously, the outer peripheral-side torsion springs 32 are arranged such that both circumferential-direction ends of each pair of outer peripheral-side torsion springs 32 are supported by the engaging portions 31a of the drive plate 31, and the bent portions 42a of the float member 42 are inserted into an intermediate portion of each pair of outer peripheral-side torsion springs 32. Also, the outer peripheral portions of the outer peripheral-side torsion springs 32 are supported by an outer peripheral portion of the float member 42.

Intermediate Member

The intermediate member 34 is an annular or circular disk-shaped plate member arranged between the piston 30 and the turbine shell 15. The intermediate member 34 includes a first plate 44 and a second plate 45. The first plate 44 and the second plate 45 are arranged to be spaced apart along the axial direction. The first plate 44 is arranged on the axial-direction transmission side and the second plate 45 is arranged on the axial-direction engine side. The first plate 44 and the second plate 45 are coupled at their outer peripheral portions with stopper pins 46 such that they cannot undergo relative rotation and cannot move in the axial direction with respect to each other. The first plate 44 and the second plate 45 each have window portions 44a and 45a that pass through in an axial direction. The first plate 44 and the second plate 45 each have window portions 44a and 45a that pass through in an axial direction.

A plurality of engaging portions 44b that extend to the outer peripheral-side torsion springs 32 are formed on an outer peripheral end of the first plate 44. The engaging portions 44b are formed by bending tip ends of the first plate 44 toward the engine in an axial direction. The engaging portions 44b are arranged with a prescribed spacing in-between in the circumferential direction and a pair of series-operating outer peripheral-side torsion springs 32 is arranged between two engaging portions 44b.

Inner Peripheral-Side Torsion Springs

Each of the inner peripheral-side torsion springs 33 includes a combination of a large coil spring and a small coil spring that is inserted into an interior of the large coil spring and has the same spring length as the large coil spring. The inner peripheral-side torsion springs 33 are arranged along a rotational direction on a radially inward side of the outer peripheral-side torsion springs 32. Each of the inner peripheral-side torsion springs 33 is arranged inside window portions 44a and 45a of both plates 44 and 45 of the intermediate member 34. Thus, both circumferential-direction ends and both radial-direction sides of each of the inner peripheral-side torsion springs 33 are supported by the window portions 44a and 45a. Additionally, the inner peripheral-side torsion springs 33 are restricted from dislodging in an axial direction by the cut and lifted portions of the window portions 44 and 45.

Driven Plate

The driven plate 35 is an annular or circular disk-shaped member, an inner peripheral portion of which is fastened along with the turbine shell 15 to the flange 17a of the turbine hub 17 with rivets 18. The driven plate 35 is arranged between the first plate 44 and the second plate 45 such that it can rotate relative to both plates 44 and 45 Window holes 35a are formed in an outer peripheral portion of the driven plate 35 so as to correspond to the window portions 44a and 45a of the first and second plates 44 and 45. The window holes 35a are holes passing through in the axial direction and the inner peripheral-side torsion springs 33 are arranged in these window holes 35a. A plurality of notches 35b that are long in a circumferential direction are formed in an outer peripheral portion of the driven plate 35 as indicated with a broken line in FIG. 2. The stopper pins 46 pass through the notches 35b in an axial direction. Thus, the driven plate 35 and the two plates 44 and 45 constituting the intermediate member 34 can undergo relative rotation within an angular range formed by the notches 35b.

Arrangement of Torus and Torsion Springs

The torus 6a of the converter main body 6a according to this embodiment is comparatively small. The outer peripheral-side torsion springs 32 of the lockup device are arranged radially outward of the torus 6a, and the inner peripheral-side torsion springs 33 are arranged radially inward of the torus 6a.

More specifically, as shown in FIG. 1, the outer peripheral-side torsion springs 32 are arranged along a rotational direction at the position of an attachment diameter Do. Meanwhile, the inner peripheral-side torsion springs 33 are arranged along a rotational direction at the position of an attachment diameter Di. Furthermore, the attachment diameter Do of the outer peripheral-side torsion springs 32 is larger than an outermost diameter To of the torus 6a, and the attachment diameter Di of the inner peripheral-side torsion springs 33 is smaller than an innermost diameter Ti of the torus 6a.

Also, in this embodiment, the outer peripheral-side torsion springs 32 are arranged more toward the transmission than the inner peripheral-side torsion springs 33 and closer to the torque converter main body 6 in terms of an axial-direction position. The portion of the turbine 4 that is closest to the front cover 2 is closer to the front cover 2 than the portions of the outer peripheral-side torsion springs 32 that are closest to the torque converter main body 6. That is, the torque converter main body 6 and the outer peripheral-side torsion springs 32 are arranged such that they overlap each other by a distance L in the axial direction.

Operation and Distinctive Characteristics

Next, the operation will be explained. A torque from the crankshaft of the engine is inputted to the front cover 2. As a result, the impeller 3 rotates and the operating oil flows from the impeller 3 to the turbine 4. This flow of operating oil causes the turbine 4 to rotate and the torque of the turbine 4 is outputted to an input shaft (not shown).

A speed ratio of the torque converter 1 increases and when the input shaft reaches a prescribed rotational speed, the operating oil in the space A drains through an oil passage inside the input shaft. As a result, the piston 30 moves toward the front cover 2. As a result, the friction facing 37 of the piston 30 is pressed against the friction surface of the front cover 2 and torque of the front cover 2 is outputted to the lockup device 7.

In the lockup device 7, the torque is transmitted in succession to the piston 30, the drive plate 31, the outer peripheral-side torsion springs 32, the intermediate member 34, the inner peripheral-side torsion springs 33, and the driven plate 35 and outputted to the turbine hub 17.

In addition to transmitting torque, the lockup device 7 absorbs and attenuates torque fluctuations inputted from the front cover 2. More specifically, when torsional vibrations occur in the lockup device 7, the outer peripheral-side torsion springs 32 and the inner peripheral-side torsion springs 33 are compressed in series between the drive plate 31 and the driven plate 35. Also, regarding the outer peripheral-side torsion springs 32, the outer peripheral-side torsion springs 32 of each pair are compressed in series.

Due to the constituent features just described, the twisting angle can be widened. Moreover, an even wider twisting angle can be secured because of the series operation of the outer peripheral-side torsion springs 32, where a longer distance can be secured in a circumferential direction. This means that the twisting characteristic can be changed to a lower stiffness and the vibration absorption and attenuation performance can be further improved.

Until the stopper pins 46 touch against the end faces of the notches 35b formed in the driven plate 35, only the large coil springs of the outer peripheral-side torsion springs 32 and the large and small coil springs of the inner peripheral-side coil springs 33 operate. After the stopper pins 46 touch against the end faces of the notches 35b formed in the driven plate 35, the large and small coil springs of the outer peripheral-side torsion springs 32 and the large (and the inner peripheral-side coil springs 33 do not operate). Thus, this lockup device 7 has a two-stage twisting characteristic.

Meanwhile, the outer peripheral-side torsion springs 32 will attempt to move toward the outer periphery due to centrifugal force. Consequently, it is necessary to provide a member to restrict movement of the outer peripheral-side torsion springs 32 toward the outer periphery. In this embodiment, movement of the outer peripheral-side torsion springs 32 toward the outer periphery is restricted by supporting an outer peripheral portion of the outer peripheral-side torsion springs 32 with the float member 42. Thus, since the float member 42 moves together with the outer peripheral-side torsion springs 32, the sliding resistance can be made smaller than a conventional device in which the outer peripheral portions of the outer peripheral-side torsion springs are supported by the drive plate.

Furthermore, with this embodiment, since the outer peripheral-side torsion springs 32 and the inner peripheral-side torsion springs 33 are coupled by the intermediate member 34, an overall hysteresis torque includes a coupling of the hysteresis torques of the inner peripheral side and the outer peripheral side. That is, with this embodiment, the hysteresis torques of the outer peripheral-side torsion springs is smaller than in the conventional device presented in Patent Document 1 and the hysteresis torque of the inner peripheral-side torsion springs is not different. Consequently, the overall hysteresis torque is even smaller. As a result, the vibration absorption and attenuation performance can be improved and a lower fuel consumption can be achieved due to an expansion of a lockup region.

The outer and inner peripheral-side torsion springs 32 and 33 are arranged such that the attachment diameter Do of the outer peripheral-side torsion springs 32 is larger than the outermost diameter To of the torus 6a and the attachment diameter Di of the inner peripheral-side torsion springs 33 is smaller than the attachment diameter Ti of the torus 6a. As a result, the torque converter main body 6 and the lockup device 7 can be arranged closer together in comparison with a conventional torque converter. Also, the torque converter main body 6 and the outer peripheral-side torsion springs 32 are arranged such that they overlap each other by a distance L in the axial direction. Consequently, the axial-direction space of the torque converter as a whole can be made more compact.

Other Embodiments

The present invention is not limited to the embodiment explained heretofore and various modifications and revisions can be made without departing from the scope of the present invention.

In the previously explained embodiment, the attachment diameter Do of the outer peripheral-side torsion springs is larger than the outermost diameter To of the torus, but it is also acceptable for these diameters to be the same. Similarly, it is acceptable for the attachment diameter Di of the inner peripheral-side torsion springs 33 and the innermost diameter Ti of the torus to be the same.

The numbers and lengths of the coil springs including the outer peripheral-side and inner peripheral-side torsion springs are not limited to the previously explained embodiment.

Effects of the Invention

With the present invention, an axial-direction space can be made more compact and the damper twisting angle of the lockup device can be widened such that the damper characteristic can be improved.

INDUSTRIAL APPLICABILITY

With this torque converter, an axial-direction space can be made more compact and the damper twisting angle of the lockup device can be widened such that the damper characteristic can be improved.

The invention claimed is:

1. A torque converter that transmits torque inputted from a front cover to a member on a transmission side, the torque converter having a torus, the torque converter comprising:
   a torque converter main body having an impeller, a turbine having a turbine shell, and a stator, the torus being formed by blades of the impeller, the turbine and the stator;

a lockup device configured to connect mechanically the front cover and the turbine together, the lockup device including
a drive plate,
a first outer peripheral-side torsion spring, the first outer-peripheral-side torsion spring receiving torque output from the drive plate and being arranged along a circumferential direction at a first spring diameter,
an inner peripheral-side torsion spring arranged along the circumferential direction at a second spring diameter radially inward of the first outer peripheral-side torsion spring, the inner peripheral-side torsion spring being configured to operate in series with the first outer peripheral-side torsion spring,
a driven plate coupled to the turbine shell and receiving torque output from the inner peripheral-side torsion spring,
a float member supporting an outer peripheral portion of the first outer peripheral-side torsion spring, the float member having a disc-shaped part and a plurality of bent portions connected thereto, a portion of the float member being disposed between the front cover and a center of the first outer peripheral-side torsion spring in a radial direction which extends substantially perpendicular to an axis of rotation of the torque converter and through the center of the first outer peripheral-side torsion spring; and
an intermediate member rotatable relative to the drive plate and the driven plate, and coupling the first outer-peripheral-side torsion spring and the inner peripheral-side torsion spring, the intermediate member including a first plate arranged on the transmission side and a second plate arranged on an engine side;
the first spring diameter being from the axis of the torque converter to the center of the first outer peripheral-side torsion spring, the second spring diameter being from the axis to a center of the inner peripheral-side torsion spring,
the first spring diameter being equal to or larger than an outer diameter being from the axis to an outermost part of the torus,
the second spring diameter being equal to or smaller than an inner diameter being from the axis to an innermost part of the torus.

2. The torque converter according to claim 1, wherein
a first portion of the turbine is closer than other portions thereof to the front cover,
a second portion of the first outer peripheral-side torsion spring and the inner peripheral-side torsion spring is closer than other parts thereof to the torque converter main body, and
the first portion is disposed closer to the front cover than the second portion.

3. The torque converter according to claim 1, wherein
the lockup device includes a second outer peripheral-side torsion spring arranged along the circumferential direction at the first spring diameter, an outer peripheral portion of the second outer peripheral-side torsion spring being supported by the float member,
the float member being rotatable in a rotational direction and being configured to cause the first and second outer peripheral-side torsion springs to operate in series.

4. The lockup device for a torque converter according to claim 3, wherein
the float member is provided such that the float member covers an outer peripheral portion of the first outer peripheral-side torsion spring.

5. The lockup device for a torque converter according to claim 1, wherein
the float member is disposed radially outward of a support portion of the drive plate.

6. A torque converter that transmits torque inputted from a front cover to a member on a transmission side, the torque converter having a torus, the torque converter comprising:
a torque converter main body having an impeller, a turbine having a turbine shell, and a stator, the torus being formed by blades of the impeller, the turbine and the stator;
a lockup device configured to connect mechanically the front cover and the turbine together, the lockup device including
a drive plate,
a first outer peripheral-side torsion spring, the first outer-peripheral-side torsion spring receiving torque output from the drive plate and being arranged along the circumferential direction at a first spring diameter,
an inner peripheral-side torsion spring arranged along the circumferential direction at a second spring diameter radially inward of the first outer peripheral-side torsion spring, the inner peripheral-side torsion spring being configured to operate in series with the first outer peripheral-side torsion spring,
a driven plate coupled to the turbine shell and receiving torque output from the inner peripheral-side torsion spring,
a float member supporting an outer peripheral portion of the first outer peripheral-side torsion spring, the float member having a disc-shaped part and a plurality of bent portions connected thereto, the disc-shaped part being disposed between the front cover and the first outer peripheral-side torsion spring in an axial direction; and
an intermediate member rotatable relative to the drive plate and the driven plate, and coupling the first outer-peripheral-side torsion spring and the inner peripheral-side torsion spring, the intermediate member including a first plate arranged on the transmission side and a second plate arranged on the engine side;
the first spring diameter being from the axis of the torque converter to the center of the first outer peripheral-side torsion spring, the second spring diameter being from the axis to a center of the inner peripheral-side torsion spring,
the first spring diameter being equal to or larger than an outer diameter being from the axis to an outermost part of the torus,
the second spring diameter being equal to or smaller than an inner diameter being from the axis to an innermost part of the torus.

* * * * *